(12) United States Patent
Lundberg et al.

(10) Patent No.: US 7,663,506 B2
(45) Date of Patent: Feb. 16, 2010

(54) DUAL MODE PILOT DIRECTOR LIGHT UTILIZING VISIBLE AND INFRARED LIGHT EMITTING DIODES (LEDS)

(75) Inventors: John L. Lundberg, Springfield, OH (US); Richard R. Kemp, Urbana, OH (US); Jeffrey M. Singer, Fairborn, OH (US); Scott R. Mangum, Dublin, OH (US)

(73) Assignee: Honeywell International Inc., Morristown, NJ (US)

( * ) Notice: Subject to any disclaimer, the term of this patent is extended or adjusted under 35 U.S.C. 154(b) by 390 days.

(21) Appl. No.: 11/776,479

(22) Filed: Jul. 11, 2007

(65) Prior Publication Data

US 2009/0015436 A1 Jan. 15, 2009

(51) Int. Cl.
*G08B 21/00* (2006.01)
(52) U.S. Cl. .................. 340/945; 340/958
(58) Field of Classification Search .......... 340/945, 340/961, 979, 958, 981, 982, 815.45; 244/135 A, 244/135 R, 129.1, 118.1, 137.1, 115, 116
See application file for complete search history.

(56) References Cited

U.S. PATENT DOCUMENTS

| | | | | |
|---|---|---|---|---|
| 4,158,885 A | * | 6/1979 | Neuberger | 340/953 |
| 5,904,729 A | * | 5/1999 | Ruzicka | 244/135 A |
| 6,244,728 B1 | * | 6/2001 | Cote et al. | 362/249.06 |
| 6,644,594 B1 | * | 11/2003 | Hunn et al. | 244/135 R |
| 6,935,595 B2 | * | 8/2005 | Butsch et al. | 340/958 |
| 2002/0196637 A1 | * | 12/2002 | Dubin et al. | 362/470 |
| 2007/0023576 A1 | * | 2/2007 | Schroeder | 244/135 A |
| 2009/0140099 A1 | * | 6/2009 | Roberts et al. | 244/135 A |

* cited by examiner

*Primary Examiner*—Eric M Blount
(74) *Attorney, Agent, or Firm*—Black Lowe & Graham PLLC

(57) ABSTRACT

Pilot Director Lights (PDLs) mounted on the exterior of a refueling tanker aircraft utilize visible light emitting diodes (LEDs) and infrared LEDs as light sources to provide visual information to the pilot of an approaching aircraft The PDLs are switchable between a visible mode that uses the visible LEDs and a covert mode that uses the infrared LEDs. The PDLs may include a plurality of light emitting devices arranged in arrays, rows, or other patterns, each light emitting device being configured to illuminate a particular symbol/pattern in one example. Each light emitting device may include a plurality of modular banks of LEDs which are configured to emit light through a clear lens within a particular field of view. The PDL arrays may provide visual feedback regarding the elevational and fore-aft position of the approaching aircraft relative to the boom envelope of the tanker aircraft.

20 Claims, 11 Drawing Sheets

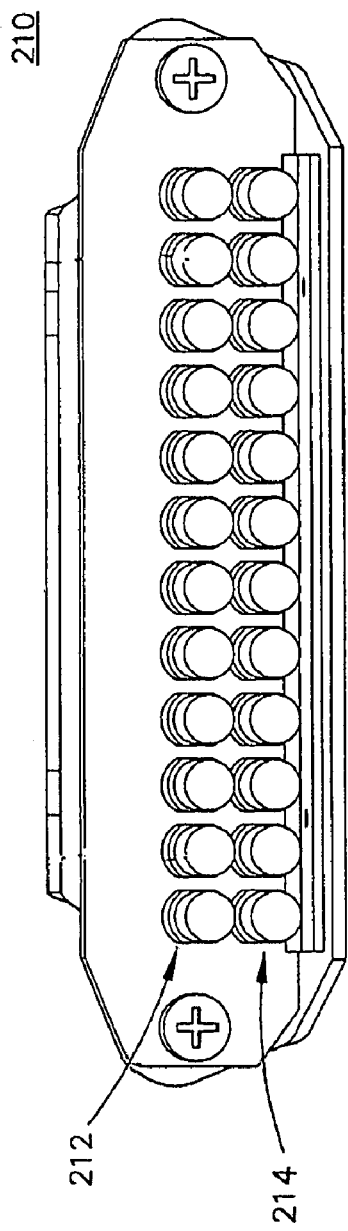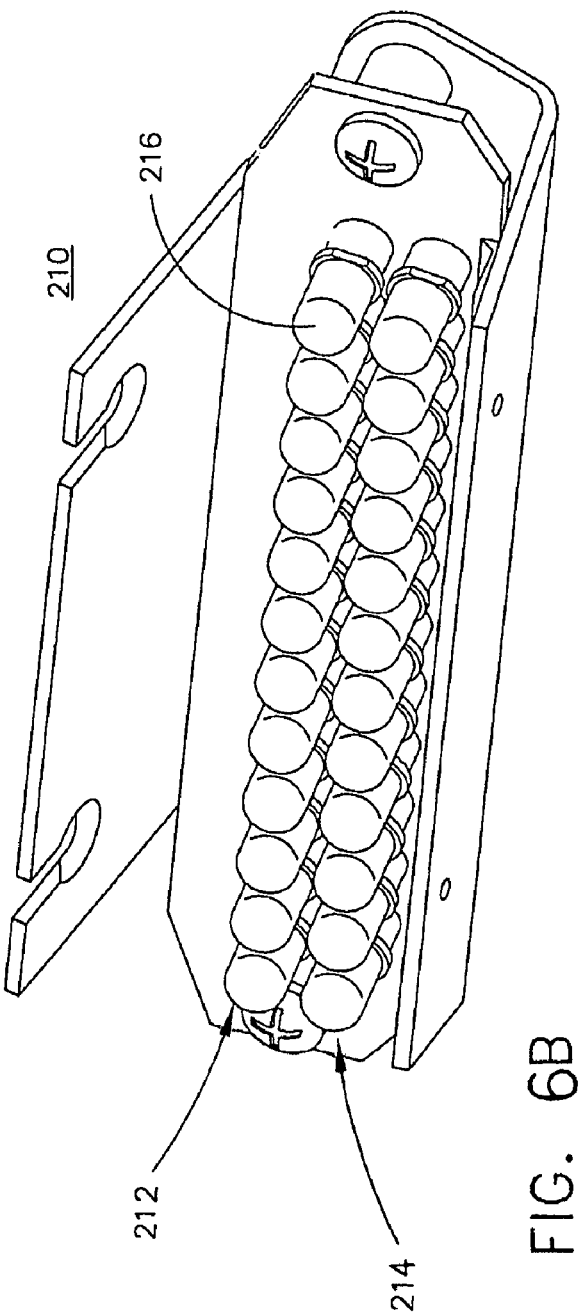
FIG. 6A
FIG. 6B

DUAL MODE PILOT DIRECTOR LIGHT UTILIZING VISIBLE AND INFRARED LIGHT EMITTING DIODES (LEDS)

BACKGROUND OF THE INVENTION

Pilot Director Lights (PDLs) generally consist of rows of lights mounted on the exterior of a refueling tanker aircraft for providing information to the pilot of an approaching aircraft to prepare for and maintain refueling boom engagement. Such lights may include lenses whose shapes or masking correspond to symbols or patterns to be illuminated to the approaching pilot.

PDLs are used for providing positional and operational feedback in order to help the approaching pilot prepare for and maintain contact between the refueling boom nozzle and a fuel receptacle of the receiving aircraft. For example, PDLs may provide information as to the elevational (vertical), telescoping (fore-aft) and lateral (azimuthal) position of the approaching aircraft relative to the refueling tanker. Also, PDLs may provide operational information to the receiving aircraft's pilot regarding, for example, the progress of the refueling process once the boom has been engaged.

FIG. 1 illustrates two light arrays used in conventional PDLs, which are mounted on a refueling tanker aircraft 10. Light array 22 is a row of lights that provide visual cues regarding the approaching aircraft's elevational position relative to an optimum position for refueling. The row of lights in light array 24 provides visual information regarding the approaching aircraft's fore-aft position relative to the optimum refueling point. As shown in FIG. 1, light array 22 is positioned on the port side of the tanker's fuselage, while light array 24 is mounted on the starboard side. Both arrays 22, 24 being located just forward of the leading edge of the wings.

FIG. 1 further shows that the symbols/patterns (arrows, rectangles, etc.) in light arrays 22 and 24 may illuminate at specific colors to provide positional information. For example, as the receiver aircraft approaches the refueling zone, the boom operator (aboard the tanker aircraft) may actuate signals through the PDLs to hold the receiver aircraft in the zone for the duration of the refueling operation. While in this zone, the lights indicate the progress of the operation along with signaling for any corrective maneuvers that the receiver pilot must perform to remain engaged with the refueling boom.

In conventional PDLs, such as those shown in FIG. 1, incandescent light bulbs may be used to illuminate the PDL symbols/patterns through tinted and diffused prismatic lenses. This results in various disadvantages. For example, the light being emitted from such PDLs may not be bright enough during daylight or fog conditions, due to losses incurred by the diffused and tinted lenses. Such losses also cause the PDLs to be very inefficient (normally less than 1% efficient). This requires the incandescent light sources in conventional PDLs to be operated at a high wattage, thereby generating much heat and reducing the operational life of the light sources.

Furthermore, conventional PDLs are not very redundant. For example, conventional PDLs may utilize two bulbs to illuminate the letter "D" of light array 22 in FIG. 1. It is possible, due to their short operational life, that one or both of these bulbs may burn out while the refueling tanker 10 is in the air, thus causing the "D" to be inadequately illuminated.

In addition, conventional PDLs, and even newer PDLs that use visible light emitting diodes (LEDs) as light sources are generally visible from a great distance at night. This is disadvantageous in situations where aircraft need to operate at night without detection by the unaided human eye.

SUMMARY OF THE INVENTION

According to an exemplary embodiment, the present invention is directed to Pilot Director Lights (PDLs) that selectively utilize visible or infrared light emitting diodes (LEDs) as light sources. Each LED may be configured to illuminate light in a particular range of wavelengths, and to direct such light in a specific direction at a narrow angle. Furthermore, the LED light sources may be configured to dissipate a low amount of power and generating less heat, as compared to incandescent light sources.

Accordingly, the PDLs in exemplary embodiments of the present invention do not require tinted or prismatic lenses to generate light at a specific color and in a specific direction. Thus, light may be illuminated at a higher efficiency. Also, the LED light sources may provide a longer operational life, resulting in less frequent burn-outs and replacements.

According to an exemplary embodiment, PDLs may be implemented as one or more rows of light emitting devices, each device employing visible and infrared LED light sources. Generally, the visible LEDs are used when visible operation is desired and the infrared LEDs are used when covert operation is desired. Each light emitting device may correspond to a specific symbol or pattern that provides positional or operational information to the pilot of an approaching aircraft. Furthermore, LEDs may be implemented in each light emitting device as modular banks. The banks of LEDs may be configured so that each bank may be replaced separately, while other banks in the device remain in operation.

In another exemplary embodiment, the LEDs in each bank may be arranged as subsets of visible or infrared LEDs, in which the LEDs of each subset are connected in series, and the subsets of visible and infrared LEDs of each bank are connected in parallel with subsets containing the same LED type (visible or infrared). In such a series-parallel configuration, a fault occurring within one subset of LEDs would not cause the other subsets to fail.

According to an exemplary embodiment, each light emitting device is comprised of a plurality of LED banks, each bank including multiple subsets of LEDs, thereby providing a high degree of redundancy. As such, a burn-out of a single LED will only effect the operation of the subset of LEDs to which it is connected, and therefore may not significantly affect the readability of the symbol or pattern being illuminated by the corresponding light-emitting device.

An exemplary embodiment of the present invention includes a mounting structure for mounting the light emitting devices of each row of PDLs to the exterior of a refueling tanker's fuselage. Such a mounting structure may include a hinged metal cover providing easy access for replacement of the LED banks. Furthermore, since tinted and prismatic lenses are not required, an optically clear lens may be integrated with the mounting structure for each light emitting device.

In another exemplary embodiment of the present invention, a control circuit is implemented to control the operation of each light emitting device. Such a control circuit may be configured to control the current flowing to the LED light sources of each light emitting device from a corresponding power supply. Furthermore, the control circuit may be configured to control a dimming operation of each light emitting device. The control circuit may also include an electromagnetic interference filter arranged between the power supply and the light emitting devices.

Further advances in scope of applicability of the present invention will become apparent from the detailed description provided hereinafter. However, it should be understood that the detailed description and specific embodiments therein, while disclosing exemplary embodiments of the invention, are provided by way of illustration only.

BRIEF DESCRIPTION OF THE DRAWINGS

Preferred and alternative embodiments of the present invention are described in detail below with reference to the following drawings:

FIGS. 6A and 6B illustrate a modular bank of visible and infrared light emitting diodes (LEDs) implemented in a light emitting device, according to an exemplary embodiment of the present invention;

DETAILED DESCRIPTION OF THE PREFERRED EMBODIMENT

Figure 1:
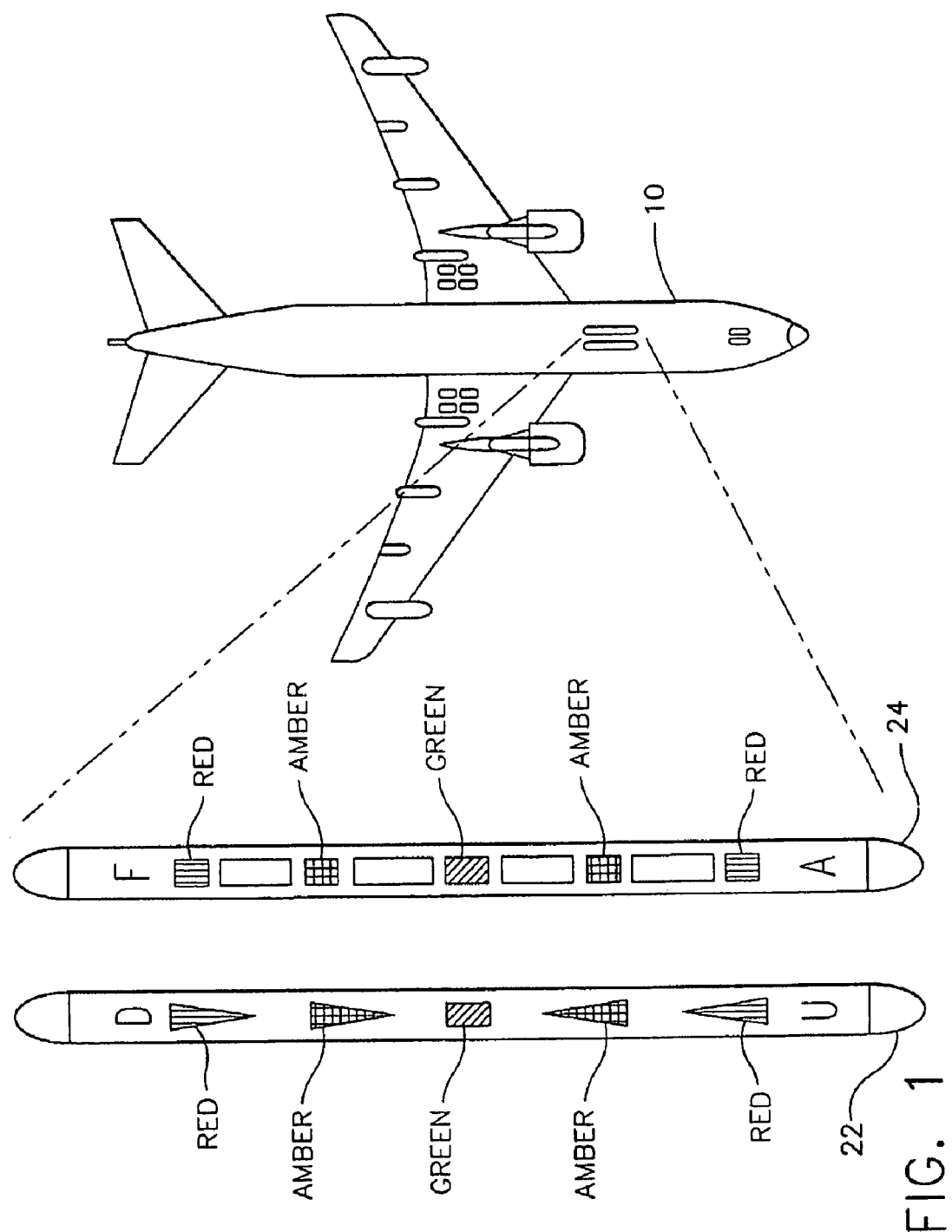
FIG. 1 illustrates the positioning and configuration of conventional PDLs on the exterior of a refueling tanker aircraft.
Figure 2:
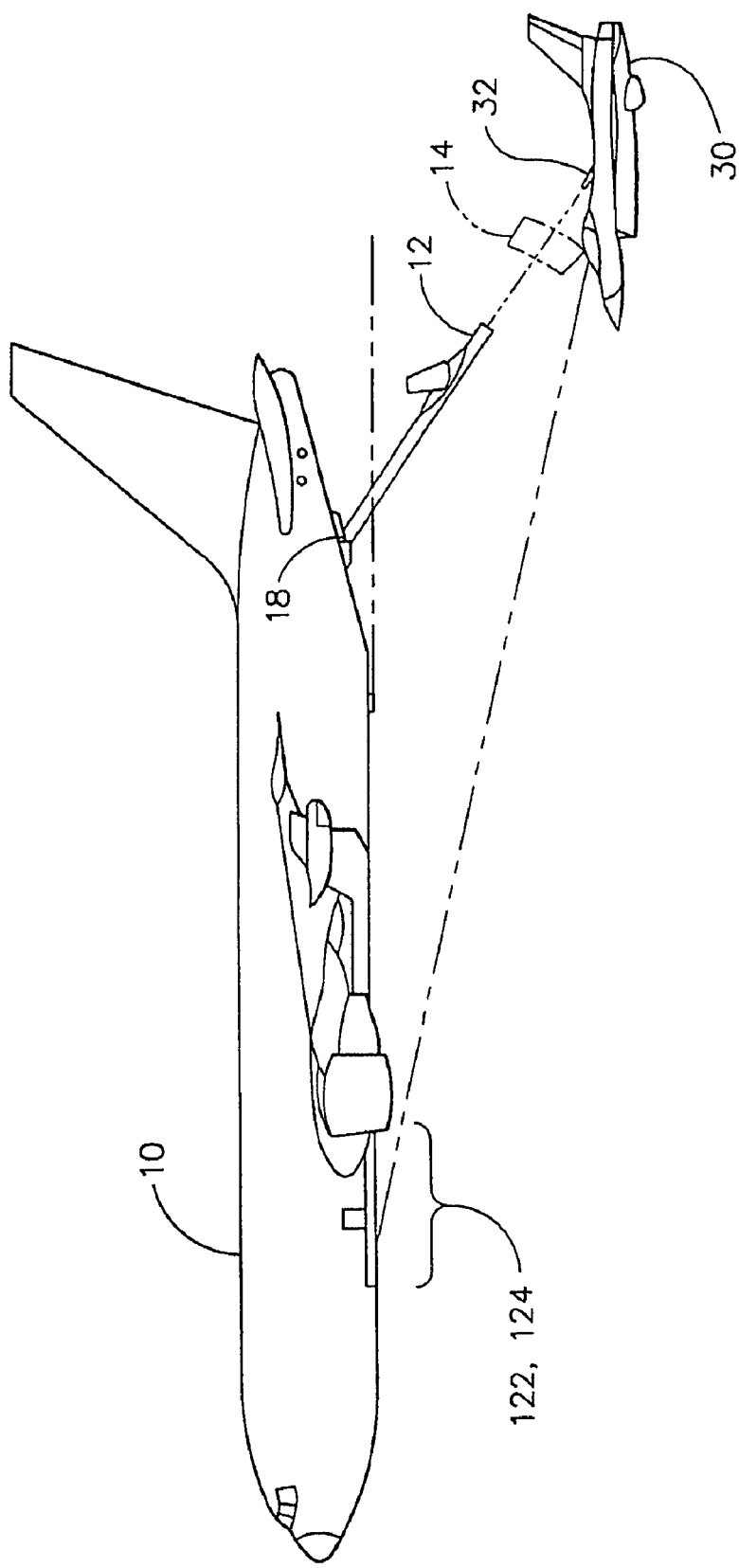
FIG. 2 illustrates a side view of PDLs mounted on the exterior of a refueling tanker aircraft, according to an exemplary embodiment of the present invention.
Figure 3:
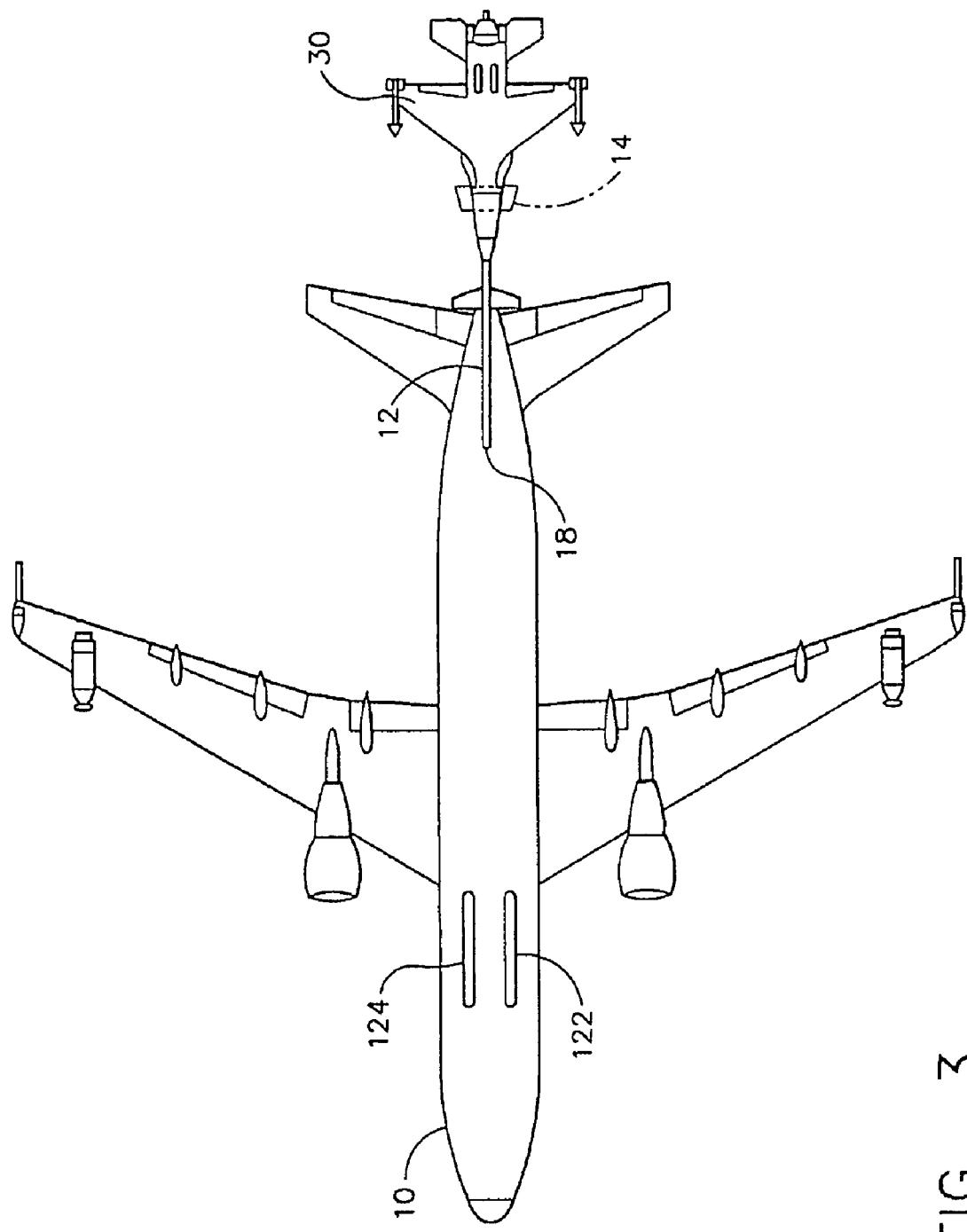
FIG. 3 illustrates an upward view of PDLs mounted on the exterior of a refueling tanker aircraft, according to an exemplary embodiment of the present invention.
Figure 10:
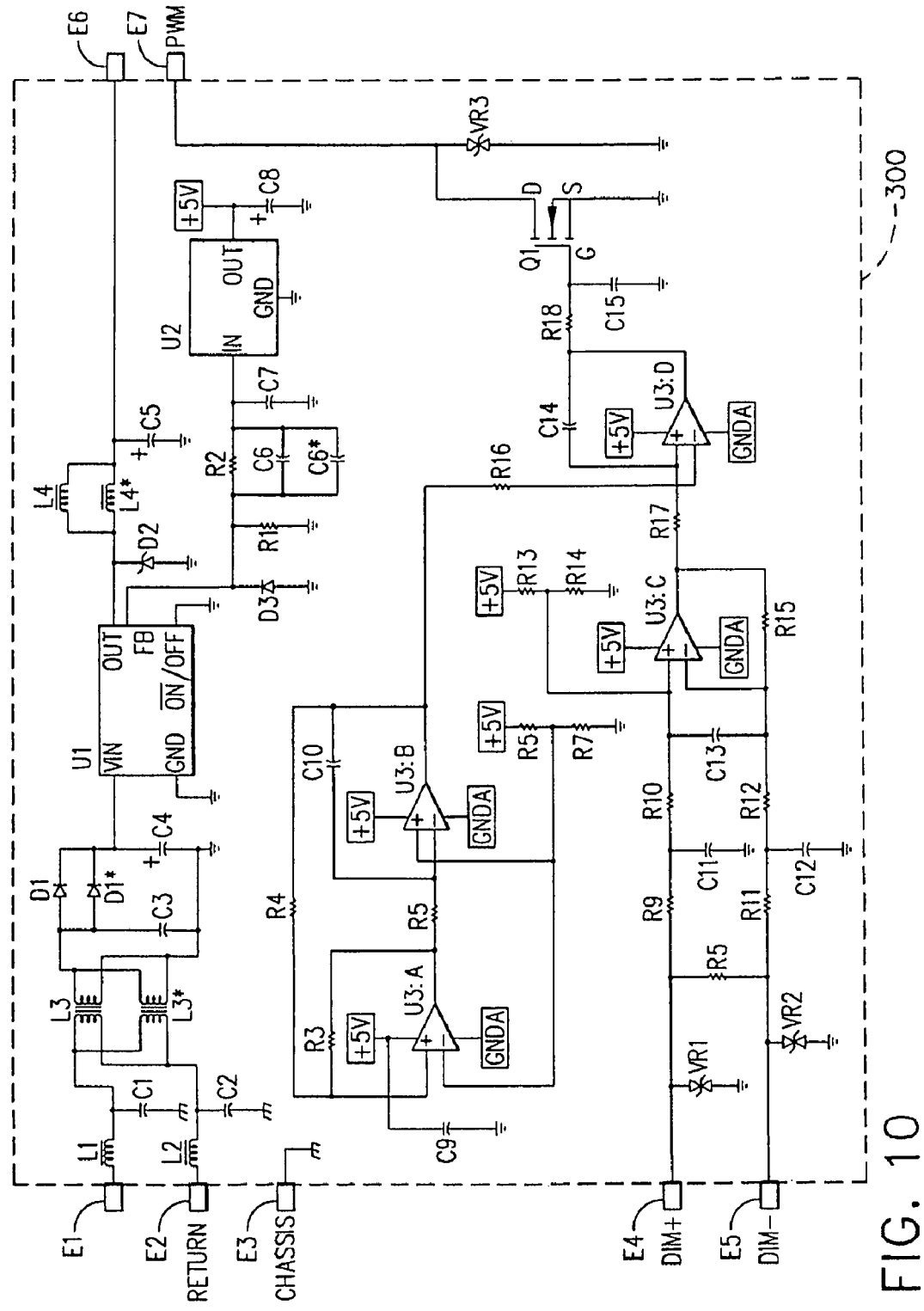
FIG. 10 illustrates a schematic diagram of the current control circuit of FIG. 9, according to an exemplary embodiment of the present invention.

The present invention is directed to dual mode Pilot Director Lights (PDLs) on the exterior of a refueling tanker aircraft, which selectively utilize visible and/or infrared light emitting diodes (LEDs) as a light source. Visible LEDs generally refer to LEDs that produce light visible to the unaided human eye. FIGS. 2 and 3 illustrate a side view and upward view, respectively, of an example implementation of PDLs on the exterior of a refueling tanker aircraft 10 for use in conducting the refueling of an approaching aircraft 30. As shown in FIG. 10, the PDLs may be implemented as two rows of lights 122 and 124, which are operable to illuminate symbols and patterns similar to those in light arrays 22 and 24 illustrated in FIG. 1. For example, row 122 may be used for providing information to the pilot of the approaching aircraft 30 as to the elevational (vertical) position of aircraft 30 with respect to an optimum position for performing the refueling operation. Also, row 124 may be configured to provide fore-aft positioning information of the approaching aircraft 30 in accordance with the optimum refueling position.

Referring to FIG. 2, the aircraft 30 attempts to position itself relative to the tanker aircraft 10 so that a refueling nozzle attached to the end of boom 12 engages with a refueling receptacle 32 of aircraft 30. As shown in FIG. 2, the boom 12 extends from a portal 18 on the tanker aircraft 10. Thus, boom envelope 14 shown in FIGS. 2 and 3 illustrates a three-dimensional range of positions at which the refueling receptacle 32 of aircraft 30 may be properly engaged with the nozzle of boom 12 for refueling. The visual cues provided by PDL rows 122 and 124 provide feedback to the pilot of aircraft 30 to adjust the aircraft's 30 relative position to place and maintain the receptacle 32 in the boom envelope 14.

It should be noted that the boom envelope 14 may be defined as a range of lengths and vertical and azimuthal angles at which the boom 12 extends in order to engage with receptacle 32.

According to an exemplary embodiment, each symbol (e.g., letter) or pattern (e.g., arrow or square) to be illuminated by the PDLs may be implemented as one of an array or row of light emitting devices (e.g., 122 or 124), each light emitting device having its own LED light source. In one example, each light emitting device includes both visible and infrared LED light sources that are selectively switchable between using the visible and the infrared LED light sources, with the infrared light sources being used when covert operation is desired.

Figure 4A:
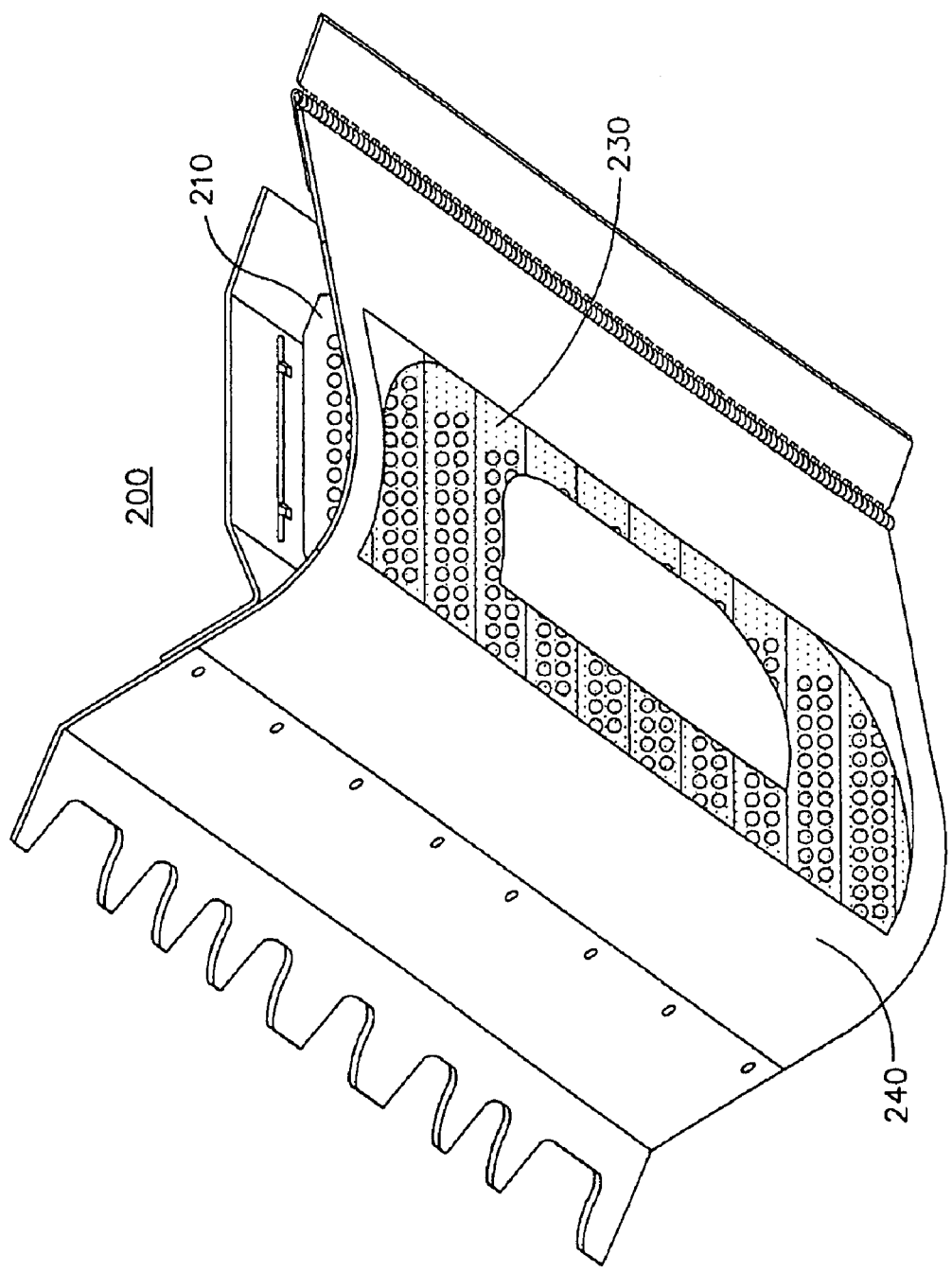
FIGS. 4A and 4B illustrate a light emitting device for illuminating a particular symbol, according to an exemplary embodiment of the present invention.
Figure 4B:
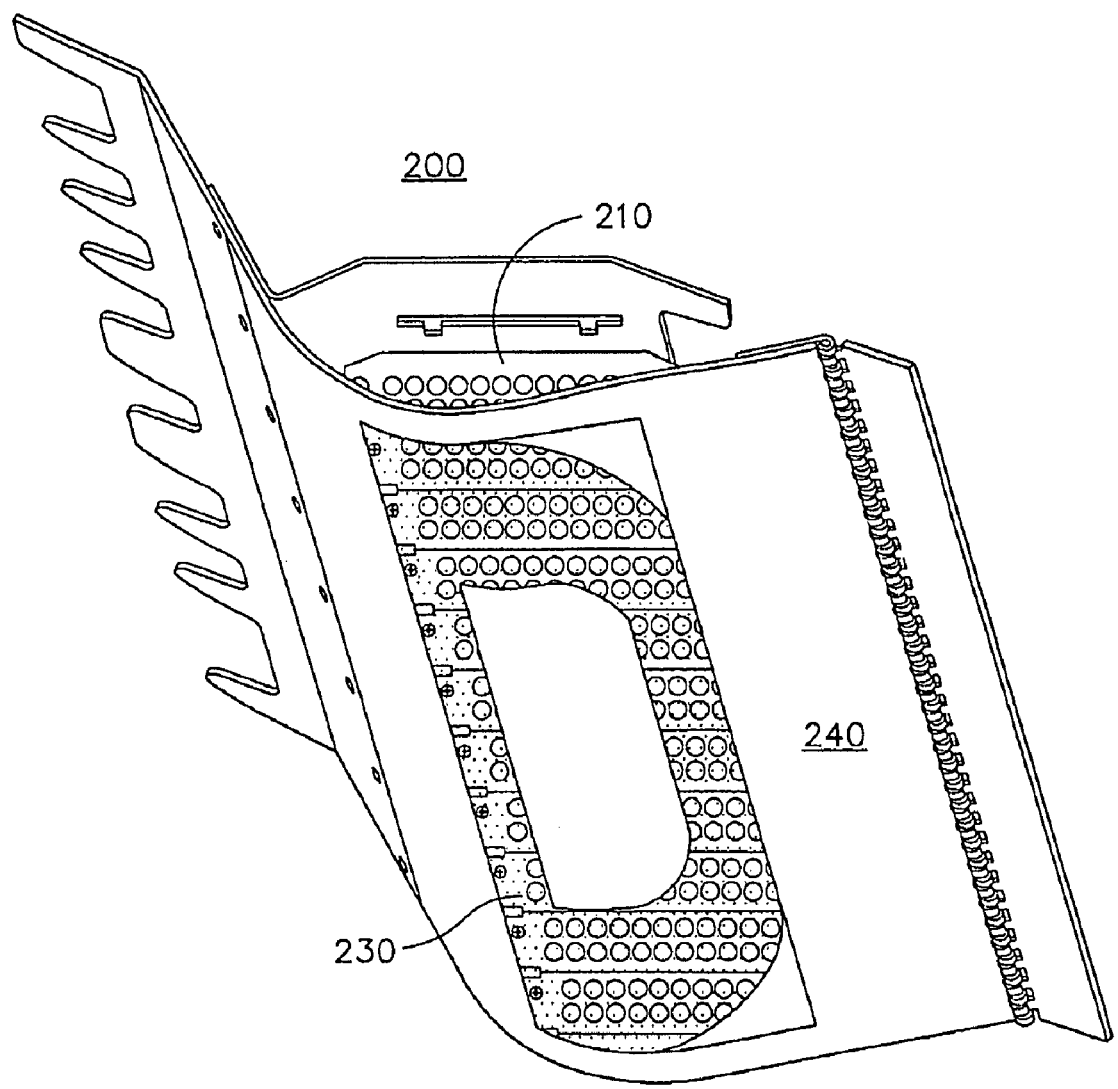

FIGS. 4A and 4B illustrate a light emitting device 200 according to an exemplary embodiment. Specifically, FIGS. 4A and 4B illustrate a light emitting device 200 configured to illuminate the "D" implemented in row 122 to provide elevation position feedback.

FIGS. 4A and 4B show that light emitting device 200 includes a light source, which is comprised of a plurality of modular banks of LEDs 210 encased within a mounting structure. In an example embodiment, the modular banks of LEDs 210 include both visible and infrared LEDs. The mounting structure is comprised of a metal cover 240 and a clear lens 230. The mounting structure is used for attaching the light emitting device to the exterior of the refueling tanker 10. In an exemplary embodiment, the metal cover may have an aerodynamic shape as illustrated in FIGS. 4A and 4B.

According to an exemplary embodiment, the letter "D" may be created on lens 230 by a masking process. In such a process, a covering (e.g., masking tape) in the shape of the letter "D" is placed over the lens 230, and the uncovered portion of the lens 230 is painted. Thus, when the covering is removed, the unpainted portions of lens 230 will form the letter "D." This process may also include screen printing. It will be readily apparent that the above-described masking process may be used to create other symbols/patterns.

As shown in FIGS. 4A and 4B, the LED banks 210 may be positioned at a particular angle with respect to the lens 230 to cause the light-emitting device 200 to emit light at a particular field of view directed to the approaching aircraft 30. A more detailed description of the range and field of view corresponding to a light emitting device 200 will be provided below in connection with FIGS. 6A-8.

Figure 5:
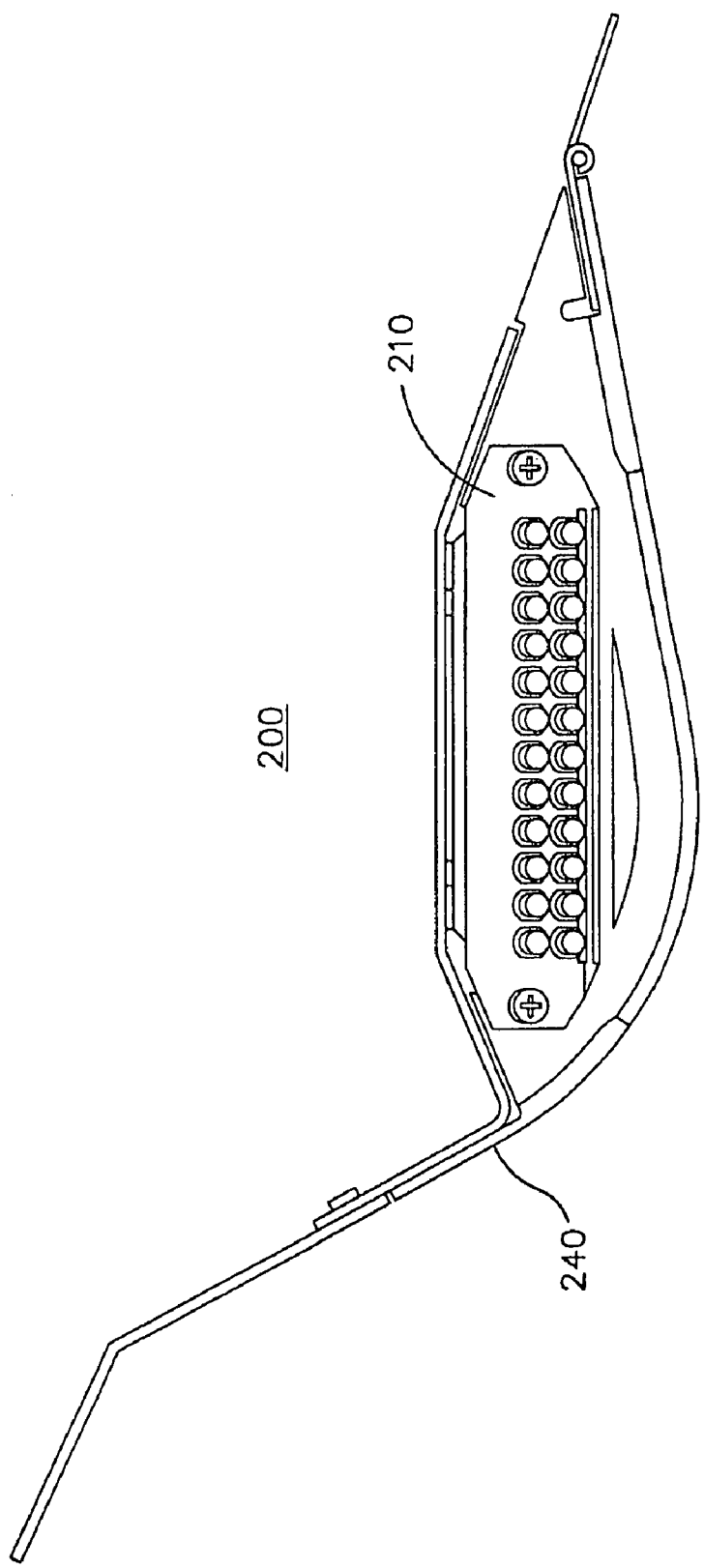
FIG. 5 illustrates a cross-sectional view of the light emitting device in FIG. 2, according to an exemplary embodiment of the present invention.

FIG. 5 illustrates a cross-sectional view of a light emitting device 200. FIG. 5 illustrates an aerodynamic shape for the metal cover 240, according to an exemplary embodiment. Furthermore, FIG. 5 illustrates a modular bank of LEDs 210, which is implemented in the light emitting device 200 at a particular angle with respect to the metal cover 240 and clear lens 230 (not shown).

FIGS. 6A and 6B provide a more detailed illustration of an example of the modular bank of LEDs 210 (sometimes referred to hereinafter as a "module"). As shown in FIGS. 6A and 6B, each module 210 includes a first row of visible LEDs 212 and a second row of infrared LEDs 214. In one example, each LED 212, 214 includes a narrow angle emitter 216, which is the circular configuration at the end of the LED 212, 214 for emitting light. According to an exemplary embodiment, each narrow angle emitter 216 is configured to emit light that disperses at a relatively narrow angle, e.g., an angle of 30 degrees or less. Such narrow angle emitters 216, and their principle of operation, are well known to those of ordinary skill in the art. In one example, the infrared LEDs 214 have a wavelength of approximately 850 nanometers, and are operable throughout a temperature range of at least −55° C. to +75° C. Infrared LEDs, such as those available from Epitex, Inc. or Osram, Inc. are used in an example embodiment. The infrared LEDs 214 are compatible with night vision imaging systems (NVIS), and the light produced from them may be seen using specialized goggles, for example.

As will be described below in more detail, the relatively low angle of dispersion of light emitted by the narrow angle emitters 216 may be instrumental in determining the field of view through which light is illuminated by the corresponding light emitting device 210.

Referring to FIGS. 6A and 6B, each module 210 includes multiple rows of LEDs. Although the rows are shown to be the first row of visible LEDs 212 and the second row of infrared LEDs in this example, other configurations may be used in other embodiments. For example, each row may include an alternating pattern of visible and infrared LEDs or some other pattern of visible and infrared LEDs. Additionally, in other embodiments, modules that include all visible and all infrared LEDs rather than a row of each may be used in alternating or other patterns. In still other embodiments, differing numbers of rows, such as two rows of visible LEDs followed by two rows of infrared LEDs, may be used in each module. Further, each row of LEDs 212, 214 may include a series-parallel connection. According to such an embodiment, the LEDs 212, 214 of each row are arranged in subsets, each subset comprising a plurality of LEDs 212 or 214 connected in series. The serially connected subsets of LEDs 212 and 214 within a row are then connected in parallel with respect to other subsets of serially connected LEDs 212 and 214, such that serially connected subsets of visible LEDs 212 are connected in parallel with other serially connected subsets of visible LEDs 212 and serially connected subsets of infrared LEDs 214 are connected in parallel with other serially connected subsets of infrared LEDs 214.

Based on the series-parallel connections, when a fault occurs in one subset, e.g., one of the LEDs 212, 214 fails, only the other LEDs 212, 214 within the same serially connected subset are affected. Thus, when one LED 212, 214 burns out, only the LEDs 212, 214 in the same subset may be lost; the LEDs 212, 214 in the other subsets may continue operating normally.

According to an exemplary embodiment, the configuration of each module 210 in a light emitting device 200 may include a first row of visible LEDs 212 and a second row of infrared LEDs 214, where each row includes twelve LEDs 212 or 214 respectively. Such a configuration provides a high luminance-power efficiency, based on the current-driven characteristics of the LEDs 212, 214.

Furthermore, if the visible LEDs 212 within a module 210 are configured to emit red or amber light, the twelve LEDs 212 within the row of visible LEDs 212 may be arranged in two subsets of six series-connected LEDs 212. On the other hand, if the LEDs 212 emit white or green light, the twelve LEDs 212 in the row may be arranged in three subsets, each subset containing four LEDs 212 connected in series. Such an arrangement further provides high efficiency. Rows containing infrared LEDs 214 may be connected in similar fashions.

Such a configuration may provide each light emitting device 200 with a high amount of redundancy, in order to ensure that the corresponding symbol or pattern will be illuminated despite a burn-out in any of the LEDs 212, 214. For example, a light emitting device 200 that illuminates the letter "D" may include eleven modules 210, thereby including 264 combined visible and invisible LEDs 212, 214. Such an embodiment provides much more protection against light source failure than a conventional PDL, for example, which utilizes two incandescent bulbs to illuminate "D."

Such light emitting devices 200, as described in the above embodiments, dissipates a low amount of power and generates little heat while in operation. Therefore, it is possible in exemplary embodiments to replace one of the modules 210 of a light emitting device 200 while the other modules are in operation and turned on. This provides advantages over conventional systems, in which the replacement of a light source in the PDLs require the other light sources to turn off and cool down before such replacement is performed.

It should further be noted that the low amount of power dissipation and heat generation allows the LEDs 212, 214 in the light emitting devices 200 to have a long operation life, thus requiring replacement much less frequently.

According to an exemplary embodiment, the above-described configuration of the light emitting devices 200 in a PDL system allows a perceived uniform sheet of visible or infrared light to be emitted through the lens 230 to the pilot of an approaching aircraft 30, while the pilot is in a particular field of view of the light emitting device 200. According to an exemplary embodiment, this field of view corresponds to the approaching pilot's location when the fuel receptacle 32 of aircraft 30 is in alignment with the boom envelope 14 (i.e., the receptacle 32 is lined up to receive the nozzle of the boom 12 from the refueling tanker aircraft 10).

In an exemplary embodiment, the configuration of LEDs 212, 214 in a light emitting device 200 will cause the emitted sheet of light to striate as the pilot of the approaching aircraft 30 moves out of the field of view. In other words, the light emitted from at least one of the light emitting devices 200 striates as the approaching aircraft 30 moves such that the fuel receptacle 32 moves out of alignment with the boom envelope 14. Accordingly, the pilot of aircraft 30 may be notified by the progressive striation of the emitted light of one or more of the light emitting devices 200 that he/she is falling off course and needs to correct the aircraft's 30 position with respect to tanker aircraft 10. Thus, the striation of the light emitted from the light emitting device 200 provides "passive" positional feedback. The light is visible light from visible LEDs 212 when visible operation has been selected and the light is infrared light from infrared LEDs 214 when covert operation has been selected. In other words, the position of the approaching aircraft 30 need not be actively sensed/detected at the refueling tanker aircraft 10, in order to provide this feedback to the approaching pilot.

Furthermore, the progressive striation of the light pattern emitted from the light emitting device 200 may provide an indication to the pilot of the speed at which the approaching aircraft 30 is falling off course.

The striation of emitted light may be dependent upon the angle of dispersion of the narrow angle emitters 216 along with the relative spacing of the LEDs 212, 214. Those of ordinary skill in the art will realize how such factors can be manipulated in order to cause the desired striation effect for a light emitting device 200.

Figure 7:
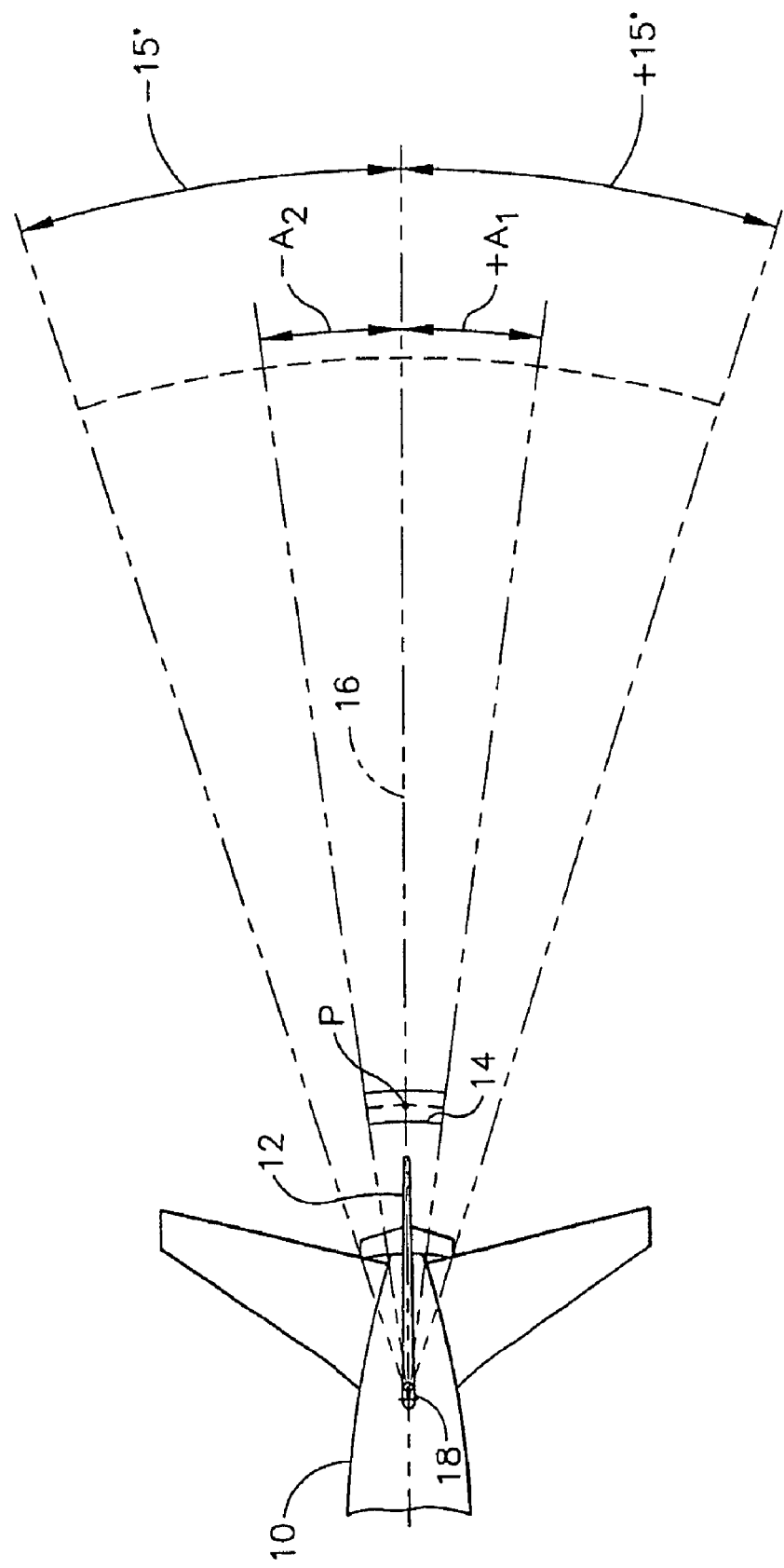
FIG. 7 illustrates an upward view of a boom envelope corresponding to the refueling boom of a tanker aircraft used for refueling an approaching aircraft, according to an exemplary embodiment of the present invention.
Figure 8:
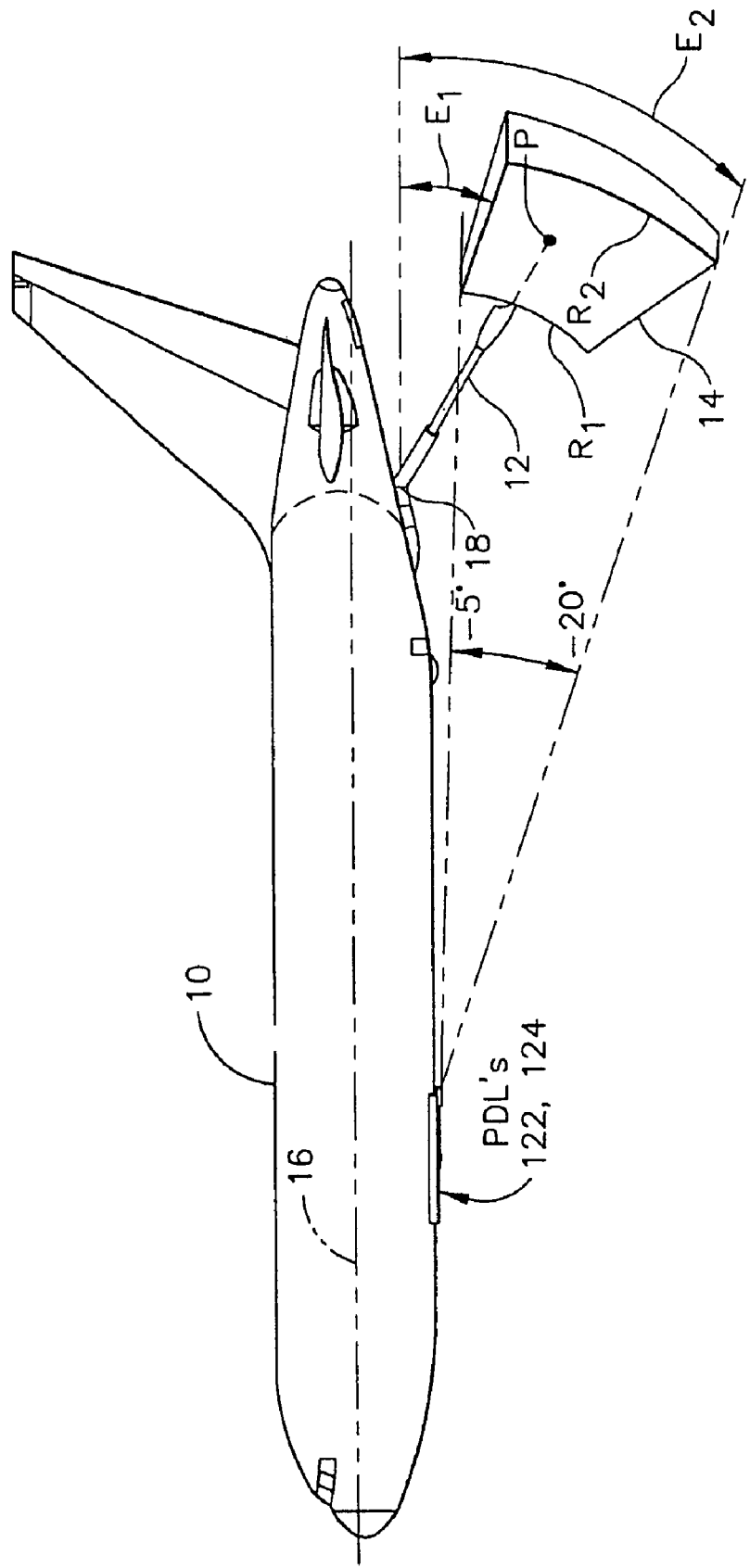
FIG. 8 illustrates a side view of a boom envelope corresponding to the refueling boom of a tanker aircraft used for refueling an approaching aircraft, according to an exemplary embodiment of the present invention.

FIGS. 7 and 8 illustrate a relationship between the boom envelope 14 and the field of view corresponding to at least one of the light emitting devices 200, according to an exemplary embodiment. As shown in FIGS. 7 and 8, the approaching aircraft 30 attempts to position itself in relation to tanker aircraft 10 so that the boom 12 will engage with the fuel receptacle 32 at a point P within the boom envelope 14.

FIG. 7 illustrates an upward view of the three-dimensional boom envelope 14, while FIG. 8 illustrates a side view of the boom envelope 14. These figures show an axis 16 through the center of the refueling tanker aircraft 10. As shown in FIG. 7, the boom envelope 14 has an azimuthal range from $+A_1$ to $-A_2$ degrees with respect to axis 16 (using boom portal 18 as an originating point). FIG. 8 shows that the range of elevational angles of boom envelope 14 is from $-E_1$ to $-E_2$ degrees with respect to a line parallel with axis 16 (where portal 18 is an originating point).

Therefore, as long as the fuel receptacle 32 of aircraft 30 remains lined up with any point P within the boom envelope 14, the light emitted from at least one of the light emitting devices 200 will appear as a sheet of light to the approaching pilot. For example, when using the visible LEDs 212, one of light emitting devices 200 in the elevational row of PDLs 122 may illuminate a solid sheet of green light (similar to the green square of array 22 in FIG. 1) when the fuel receptacle 32 is aligned with the boom envelope 14. However, as the elevational position of receptacle 32 moves outside of alignment with boom envelope 14, horizontal striations may appear in this sheet of green light. Furthermore, as the lateral (azimuthal) position of receptacle 32 moves out of alignment with boom envelope 14, vertical striations may appear in each of the symbols/patterns illuminated by row 122 to the approaching pilot. When using the infrared LEDs 214, solid and striated sheets of infrared light would be produced in a similar fashion to that described with respect to the green light when using visible LEDs.

Also, based on the configuration (e.g., the relative positions and narrow angle emitters 216) of the LEDs 212, 214, the light from a light emitting device 200 may be emitted within a limited range, striated or not. For example, FIG. 7 illustrates an azimuthal range of illumination of +15 degrees to –15 degrees with respect to axis 16. Furthermore, FIG. 8 shows an elevational range of –5 to –20 degrees with respect to a line parallel with axis 16 (using the light emitting device 200 as an originating point). When the fuel receptacle 32 is no longer aligned within these two ranges, the pilot of aircraft 30 may no longer be able to see the light being emitted by the corresponding light emitting device 200.

The limited range of illumination in such embodiments may provide the approaching pilot passive feedback as to how far the aircraft 30 has gone off course. Also, the limited range of illumination in such embodiments may allow the refueling operation to be performed somewhat covertly with respect to surrounding aircraft and ground stations even when visible LEDs 212 are used. This may be useful, e.g., during military operations where covertness is desired. However, use of the infrared LEDs 214 rather than the visible LEDs 212 allows a greater level of covert operation because the infrared LEDs 214 are generally not visible to the unaided human eye.

It should be noted that the limited range of illumination for a light emitting device 200 may be a function of other factors in addition to the narrow angle emitters 216 of LEDs 212, 214. For example, the angular positioning of the modules 210, the geometry and curvature of metal cover 240, the shape and dimensions of clear lens 230, or a combination of such factors may be used to achieve a desired range of illumination, as will be readily understood by those of ordinary skill in the art.

As described in the above embodiments, the PDLs of the present invention may direct light to a particular field of view, and utilize passive feedback such as striated light, without the need of prismatic or diffused lenses or other such devices. In exemplary embodiments, clear lenses (or no lens at all) may be used. Thus, the losses of luminance caused by the use of diffused and prismatic lenses may be avoided.

Figure 9:
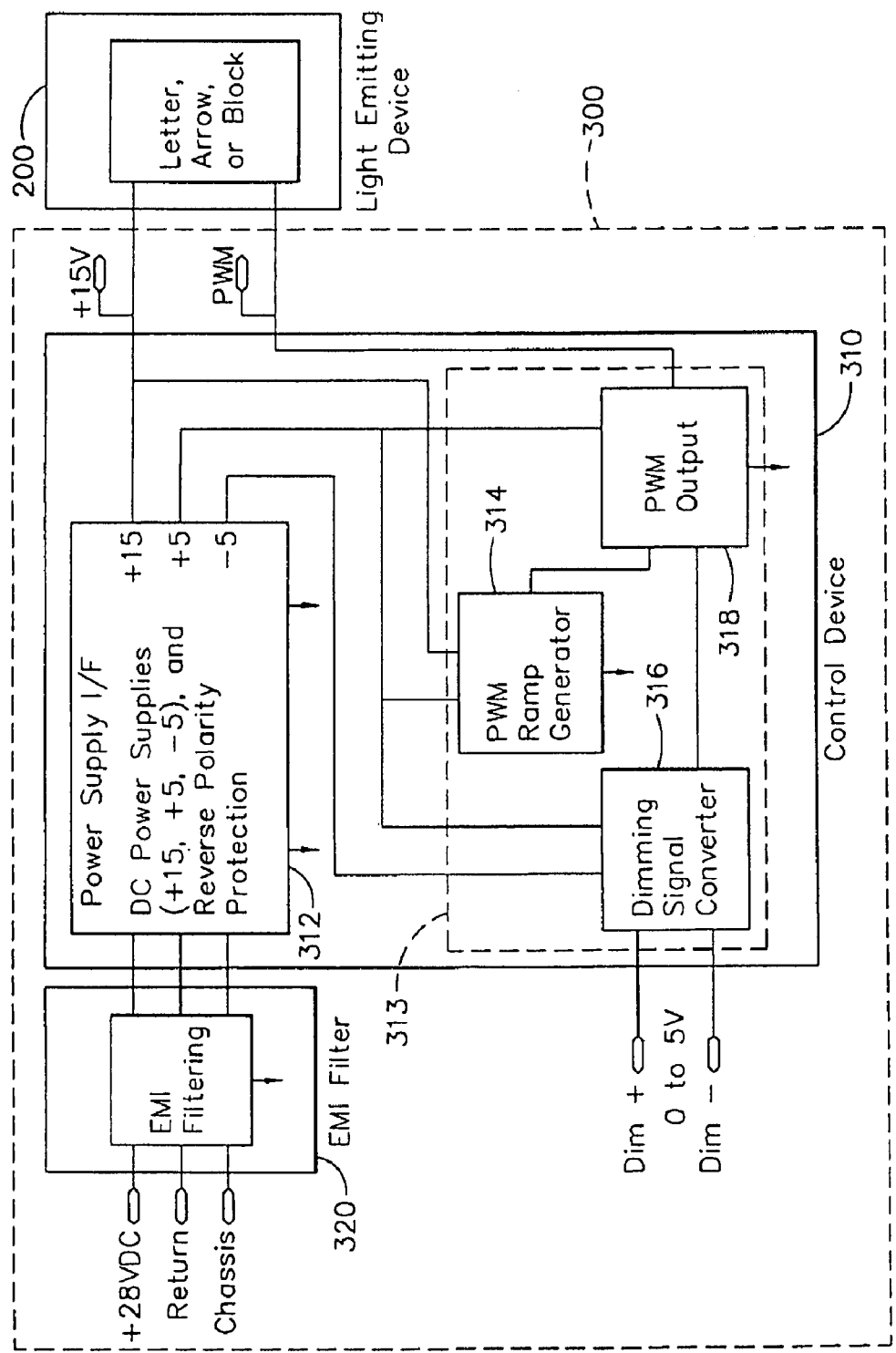
FIG. 9 illustrates a block diagram of a control circuit configured to control the current being supplied to the light emitting devices in a set of PDLs, according to an exemplary embodiment of the present invention.

Since the light source of each light emitting device 200 is comprised of current-driven components (LEDs 212, 214), exemplary embodiments of the present invention include a control circuit for controlling the current being supplied to each light emitting device 200 by a power source. FIG. 9 illustrates a block diagram of such control circuitry (referred to hereinafter as "current control device") for a particular light emitting device 200.

As shown in FIG. 9, a current control device 300 includes a control device 310 and an electromagnetic (EMI) filter 320 implemented between a DC power supply (e.g., +28 VDC) and the light emitting device 200. In particular, EMI filter 320 includes circuitry whose configuration and operation is well-known to those of ordinary skill in the art for filtering out the EMI effects of the input DC power supply. The EMI filter 320 helps protect the operation of the corresponding light emitting device 200 from being interrupted by such effects, and prohibits the PDL system from inducing interference into surrounding electronics. Additionally, each current control device 300 (or components therein) may be encased in a metallic structure equipped with EMI filtered connectors. In an example embodiment, power from the current control device 300 supplied to the visible LEDs 212 when the PDL is in a standard, visible mode and power is supplied to the infrared LEDs 214 when the PDL is in a covert mode. This may be done using switches (not shown) that selectively connect the power to either the visible LEDs 212 or the infrared LEDs 214 based on a control signal received from a human operator or a computer system. Alternatively, in other embodiments, multiple current control devices 300 may be used in such a way that any one particular current control device 300 provides power only to visible LEDs 212 or infrared LEDs 214, and provides such power only when the appropriate mode (standard visible or covert) has been selected.

The output of EMI filter 320 is supplied to a power supply interface 312 within control device 310. Power supply interface 312 generates a modular supply voltage (e.g., +15 VDC) to be distributed to each LED module 210 in the light emitting device 200. The power supply interface may also generate dimming supply voltages (e.g. ±5 VDC) to be sent to a dimming control device 313. Power supply interface 312 also includes circuitry that provides reverse polarity protection for the dimming control device 313 and light emitting device 200.

According to an exemplary embodiment, the dimming control device 313 utilizes pulse width modulation (PWM) to conduct a dimming operation on the LEDs 212 or 214 of the light emitting device 200. In particular, dimming control device 313 includes a dimming signal converter 316 for receiving a dimming control signal Dim (e.g., between 0-5 V). A PWM output unit 318 receives the converted analog voltage from dimming signal converter 316 as well as a signal generated by PWM ramp generator 314 in order to output a modulated square wave signal. The duty cycle of this square wave PWM output signal is dependent upon the magnitude of the analog signal generated by the dimming signal converter 316. The PWM output signal thus controls the level at which the LEDs 212, 214 of light emitting device 200 is illuminated. In an example embodiment, the dimming control device 313 is used during covert operation mode to supply a first output signal to the infrared LEDs 214 that results in the LEDs having a predetermined low brightness level to provide symbol and shape definition and a second output signal to selected infrared LEDs 214 that results in the selected LEDs 214 having a predetermined higher brightness level than those to which the first output signal is being supplied by the dimming control device 313.

Various circuit arrangements and configurations may be utilized to implement the components of control device 310, as will be readily apparent to those of ordinary skill in the art.

FIG. 10 is a schematic diagram illustrating an example implementation of the various components of the current control device 300 of FIG. 9, according to an exemplary embodiment. It should be noted however that FIG. 10 is provided for purposes of illustration, and should not be construed as limiting the configuration and components of the current control device 300 of the present invention.

The connections of the power supply and dimming control in FIG. 10 are as follows. The DC power supply (e.g., +28 VDC) and return are connected to terminals E1 and E2. Terminal E3 is connected to ground. The dimming signal Dim and return are connected to terminals E4 and E5. Terminals E6 and E7 output the supply voltage (e.g., +15 V) and the PWM output signal, respectively, to the LED banks 210.

The components of FIG. 10 are implemented in the functional components of FIG. 9 as follows. The configuration including inductors L1-L4 and capacitors C1-C3 comprise the EMI filter 320. The configuration of FIG. 10 including power converter U1, capacitors C4-C8, inductors L4, diode D3, and voltage regulator U2 corresponds to the power supply interface 312. The PWM ramp generator 314 includes the configuration of op amps U3:A and U3:B, and capacitors C9 and C10 in FIG. 10. The dimming signal converter 316 corresponds to the configuration in FIG. 10 including diodes VR1 and VR2, capacitors C11-C13 and amplifier U3:C. The PWM output unit 318 is illustrated in FIG. 10 as the configuration including amplifier U3:D, capacitors C14 and C15, transistor Q1, and diode VR3. Those of ordinary skill in the art will appreciate the principles of operation and the various means of implementation of the circuit configuration illustrated in FIG. 10.

According to an exemplary embodiment, the dimming control device may be controlled manually by the boom operator on the tanker aircraft 10, or automatically by devices/computers in the aircraft 10. The dimming control device 313 may be used to dim the LEDs 212, 214 of a light emitting device 200 in order to provide visual feedback to the pilot of an approaching aircraft 30. For example, the luminance of a PDL may be set higher for daylight or low visibility conditions (e.g., cloud cover, precipitation, etc.), set lower for night operations, or use varying brightness levels when the infrared LEDs 214 are used. Selection of the standard mode using the visible LEDs 212 or the covert mode using the infrared LEDs 214 also may be controlled manually by the boom operator on the tanker aircraft 10, or automatically by devices/computers in the aircraft 10 in an example embodiment. Additionally, in an example embodiment, the pilot of the approaching aircraft 30 or devices/computers in the approaching aircraft 30 may send requests to the tanker aircraft 10 indicating whether manual or automatic operation is desired, as well as whether standard or covert mode should be used.

In an exemplary embodiment, the dimming operation may be performed at night, to ensure that the light from the light emitting device 200 is not too bright. This may improve readability for the approaching pilot and increase the covertness of the refueling operation.

While the PDLs in the above exemplary embodiments are described as providing elevational and fore-aft positional feedback to the pilot of an approaching aircraft 30, it should be noted that other types of information can be conveyed using the present invention. For example, the light emitting devices 200 of the present invention may be used to provide feedback as to the status of the refueling operation after the refueling boom 12 has been engaged with the fuel receptacle 32. Furthermore, a light emitting device 200 may be used to notify the approaching pilot that boom engagement has been made.

Also, the PDLs of the present invention may be used to help direct the approaching aircraft 30 to a position P before boom engagement is made, and to assist the pilot in keeping the aircraft 30 within an acceptable position after boom engagement has been made.

While the preferred embodiment of the invention has been illustrated and described, as noted above, many changes can be made without departing from the spirit and scope of the invention. For example, both visible and infrared LEDs may be used at the same time in some operational modes, rather than using exclusively visible or exclusively infrared LEDs. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A dual mode pilot director light (PDL) apparatus mounted on a refueling tanker aircraft for directing a pilot in an approaching aircraft, the apparatus comprising:
   one or more light emitting devices, each including a first visible light emitting diode (LED) light source and a second infrared (IR) LED light source, at least one light emitting device emitting a light pattern that provides positional feedback to the pilot in the approaching aircraft, wherein the pilot's perception of the light pattern changes as the approaching aircraft's relative position falls off course with respect to at least one of an azimuthal and elevational range corresponding to the refueling aircraft's boom envelope, such that the change in perception indicates to the pilot that the approaching aircraft has fallen off course, and wherein the light emitting devices are controllable to selectively use either the first LED light source in a standard mode or the second LED light source in a covert mode.

2. The apparatus of claim 1, further comprising: a clear lens covering each of the light emitting devices.

3. The apparatus of claim 1, wherein each light emitting device is operable to illuminate a symbol.

4. The apparatus of claim 3, wherein when the covert mode is selected, the IR LED light source operates at a predetermined low level brightness level when inactive and at a predetermined higher brightness level when active.

5. The apparatus of claim 1, the light emitting devices being arranged into first and second assembly strips to provide positional feedback to the pilot, the light emitting devices in the first assembly strip are configured to provide feedback regarding fore-aft positioning of the approaching aircraft, and the light emitting devices in the second assembly strip are configured to provide feedback regarding elevation positioning of the approaching aircraft.

6. The apparatus of claim 1, wherein each light emitting device is configured to illuminate a symbol or direction for providing at least one of positional and operational feedback with respect to a refueling operation being performed on the approaching aircraft.

7. The apparatus of claim 1, wherein at least one of the light emitting devices is configured to emit a sheet of light, through a corresponding lens, to the pilot when a fuel receptacle of the approaching aircraft is aligned with a boom envelope associated with the refueling tanker aircraft.

8. A dual mode pilot director light (PDL) apparatus mounted on a refueling tanker aircraft for directing a pilot in an approaching aircraft, the apparatus comprising:

one or more light emitting devices, each including a first visible light emitting diode (LED) light source and a second infrared (IR) LED light source, wherein the light emitting devices are controllable to selectively use either the first LED light source in a standard mode or the second LED light source in a covert mode, wherein at least one of the light emitting devices is configured to emit a sheet of light, through a corresponding lens, to the pilot when a fuel receptacle of the approaching aircraft is aligned with a boom envelope associated with the refueling tanker aircraft, and wherein the at least one of the light emitting devices is configured so that the emitted sheet of light striates as the fuel receptacle moves out of alignment with the boom envelope.

9. A dual mode pilot director light (PDL) apparatus mounted on a refueling tanker aircraft for directing a pilot in an approaching aircraft, the apparatus comprising:

one or more light emitting devices, each including a first visible light emitting diode (LED) light source and a second infrared (IR) LED light source, at least one light emitting device emitting a light pattern that provides positional feedback to the pilot in the approaching aircraft, wherein the pilot's perception of the light pattern changes as the approaching aircraft's relative position changes, thereby providing the positional feedback to the pilot, and wherein the LED light source of at least one of the light emitting devices includes one or more modules of LEDs, each of the LEDs including a narrow angle emitter for emitting light, and wherein the light emitting devices are controllable to selectively use either the first LED light source in a standard mode or the second LED light source in a covert mode.

10. The apparatus of claim 9, wherein the narrow angle emitter is configured to emit light, which disperses substantially at an angle of 30 degrees.

11. The apparatus of claim 9, further comprising a mounting structure for each of the light emitting devices, each mounting structure including, a hinged metal cover having openings corresponding to each module; and a clear lens covering each opening, wherein the metal cover is configured so that each opening provides a range of illumination through the corresponding clear lens.

12. The apparatus of claim 11, wherein the range of illumination includes an elevational range of substantially −5 and −20 degrees, and an azimuthal range of substantially +15 and −15 degrees, with respect to a longitudinal axis of the refueling tanker aircraft.

13. The apparatus of claim 9, wherein each module includes multiple rows of LEDs arranged in subsets, each subset includes one or more LEDs connected in series, and at least two subsets of each row are connected in parallel.

14. The apparatus of claim 13, wherein each subset of the module is electrically isolated from faults occurring with respect to other subsets in the module.

15. The apparatus of claim 13, wherein each module includes 2 rows of LEDs, each row including 12 LEDs, and each row is configured to include at least one of: 2 subsets of 6 LEDs, and 3 subsets of 4 LEDs.

16. The apparatus of claim 13, wherein each light emitting device is configured so that any module can be replaced while other modules in the light emitting device are in operation.

17. The apparatus of claim 9, wherein each module can be replaced while other modules are in operation.

18. The apparatus of claim 9, further comprising: a current control device configured to control the current supplied to each light emitting device.

19. The apparatus of claim 18, wherein the current control device includes, a dimming control device configured to utilize pulse width modulation (PWM) to conduct dimming of the LEDs in the light emitting device; and a power supply interface operably connected to a power supply, the power supply interface being configured to generate supply voltages and provide reverse polarity protection for the dimming control device and the light emitting device.

20. The apparatus of claim 1, wherein the positional feedback is provided to the pilot without requiring a determination at the refueling tanker aircraft of the approaching aircraft's relative position.

* * * * *